United States Patent [19]
Arinaga et al.

[11] Patent Number: 6,160,499
[45] Date of Patent: Dec. 12, 2000

[54] MAGNETIC ENCODER APPARATUS

[75] Inventors: Yuji Arinaga; Koji Suzuki; Satoshi Murakami, all of Fukuoka, Japan

[73] Assignee: Kabushiki Kaisha Yaskawa Denki, Kitakyushu, Japan

[21] Appl. No.: 09/402,884

[22] PCT Filed: Apr. 10, 1998

[86] PCT No.: PCT/JP98/01677

§ 371 Date: Oct. 14, 1999

§ 102(e) Date: Oct. 14, 1999

[87] PCT Pub. No.: WO98/46968

PCT Pub. Date: Oct. 22, 1998

[30] Foreign Application Priority Data

Apr. 16, 1997 [JP] Japan .................................. 9-115214

[51] Int. Cl.[7] .................................................. H03M 1/22
[52] U.S. Cl. .................................................. 341/15
[58] Field of Search .................. 341/11, 13, 15, 341/1, 2

[56] References Cited

U.S. PATENT DOCUMENTS 5,625,289  4/1997  Daetz et al. ............................ 341/15
5,774,074  6/1998  Cooper et al. ......................... 341/11

FOREIGN PATENT DOCUMENTS

| 0 630 097 A2 | 12/1994 | European Pat. Off. . |
| 44 08 623 A1 | 9/1994 | Germany . |
| 195 13 692 C1 | 7/1996 | Germany . |
| 5-52584 | 3/1993 | Japan . |

*Primary Examiner*—Brian Young
*Attorney, Agent, or Firm*—Morgan, Lewis & Bockius LLP

[57] ABSTRACT

A magnetic encoder apparatus comprises a moving disk 5 made of a magnetic substance including a position detection slit track 31 provided with a slit for detecting the position thereof, a magnetic pole detection slit track 33 provided with a slit for detecting the magnetic pole of a motor, and a reference detection slit track 32 provided with a slit for detecting the reference position thereof, magnetic sensors 1 being spaced out the moving disk; bias magnets 2 each provided on the back face of the respective magnetic sensors and situated at where corresponds to the respective slit tracks, and a signal processing circuit 6 for processing a signal from the magnetic sensors.

1 Claim, 5 Drawing Sheets

MAGNETIC ENCODER APPARATUS

TECHNICAL FIELD

The present invention relates to a magnetic encoder apparatus.

DESCRIPTION OF RELATED ART

Conventionally, as the first conventional example, as a gear type magnetic encoder, an encoder shown in FIG. 6 is used. In FIG. 6, a magnetic sensor 1 attached with a bias magnet 2 is oppositely arranged to a magnetic substance gear 81. Operations thereof will be described below. When the magnetic substance gear 81 is rotated and each cog approaches the magnetic sensor 1, magnetic flux from the bias magnet 2 easily pass through the gear, and the magnetic flux applied to the magnetic sensor 1 is increased. When the gear is further rotated and the cog goes away from the magnetic sensor 1, magnetic resistance is increased, and the magnetic flux applied to the magnetic sensor 1 is decreased. As described above, a change of magnetic flux due to a change of magnetic resistance is detected by the magnetic sensor 1 composed of magnetoresistive elements, and is converted into an electric signal. Further, the change of the electric signal is wave-shaped by a comparator 73 and a square wave is obtained. In this system, a gear is used and a change of reluctance of the magnetic circuit is utilized, and therefore this system is called a reluctance type.

As the second conventional example, an example as shown in FIG. 7 is disclosed (in Japanese Patent Publication No. 5-52584A). In this example, a rotation disk 10 which is a moving body, is integrally composed of a disk-like mask member 10d and a disk-like permanent magnet 9. The permanent magnet 9 is magnetized as a single pole in its axis direction, and structured to have a pair of magnetic poles on each side. The mask member 10d is made of soft magnetic substance, and on its peripheral portion, a plurality of slits are formed into ring-like arrangement with a predetermined pitch. According to this structure, in the mask member 10d, a slit portion 10c having high magnetic resistance, and a strip portion 10b having low magnetic resistance are alternately formed along the rotational direction of the rotation disk 10. Thereby, a magnetic pole 10a, in which magnetic flux from the permanent magnet 9 is alternately changed along the outer peripheral portion of the rotation disk 10, is formed. In the structure described above, when the rotation disk 10 is rotated, the magnetic flux affecting from the magnetic pole 10a to the magnetic sensor 1 is periodically changed, and a detection signal which is changed corresponding to the arrangement pitch of the magnetic pole 10a, is outputted from the magnetic sensor 1.

Incidentally, in the gear method as the first conventional example, it is necessary that a magnetic sensor is arranged at a position opposite to the gear, and therefore, there is a problem that a size in the diameter direction is increased, and further, only one kind of signal is obtained by the magnetic sensor. When it is necessary to obtain the other signals such as, for example, a reference signal, a pole sensor signal, or the like, it is required that another gear is prepared, or thickness of the gear is increased to form another cogs for another signal, resulting in a high production cost, which is a problem. Further, in the method in which the rotation disk is formed by integrating a mask member, on which magnetic shield slits are arranged, with the permanent magnet, as in the second conventional example, there is a problem that it is difficult to reduce the thickness of the rotation disk by the influence of a demagnetizing field of the permanent magnet.

DISCLOSURE OF THE INVENTION

The object of the present invention is to provide a thin type high performance encorder apparatus by which the production cost is lowered and plural kinds of signals can be detected, wherein the moving disk is formed into a magnetic thin plate using no permanent magnet, and a plurality of slit tracks are formed thereon, and a magnetic sensor is arranged corresponding to each slit track.

In order to achieve the above object, according to the present invention, there is provided a magnetic encoder apparatus comprising: a moving disk made of a magnetic substance including: a position detection slit track provided with a slit for detecting the position thereof; a magnetic pole detection slit track provided with a slit for detecting the magnetic pole of a motor; and a reference detection slit track provided with a slit for detecting the reference position thereof; magnetic sensors being spaced out the moving disk; bias magnets each provided on the back face of the respective magnetic sensors and situated at where corresponds to the respective slit tracks; and a signal processing circuit for processing a signal from the magnetic sensors.

The apparatus may be configured that: the magnetic pole detection slit track is situated outer than the position detection slit track and includes a protruded portion protruding to outer diameter of the moving disk and a notched portion; and the reference detection slit track is situated inner than the position detection slit track.

The apparatus may be configured that: a non-magnetic substance is provided between each of the magnetic sensor and the bias magnet provided for the magnetic pole detection slit track.

The apparatus may be configured that: the magnetic sensor provided for the magnetic pole detection slit track includes three pairs of six magnetic sensors for a phase signal and a reversal signal thereof to detect the magnetic pole of 3-phase motor; and the signal processing circuit includes a magnetic pole detection signal processing circuit having a differential amplifier circuit to differentially amplify the three pairs of signals.

BRIEF DESCRIPTION OF THE DRAWINGS

FIG. 2 is a view showing a magnetic pole detection section of the magnetic encoder apparatus of the present invention.

BEST MODE FOR CARRYING OUT THE INVENTION

Figure 1:
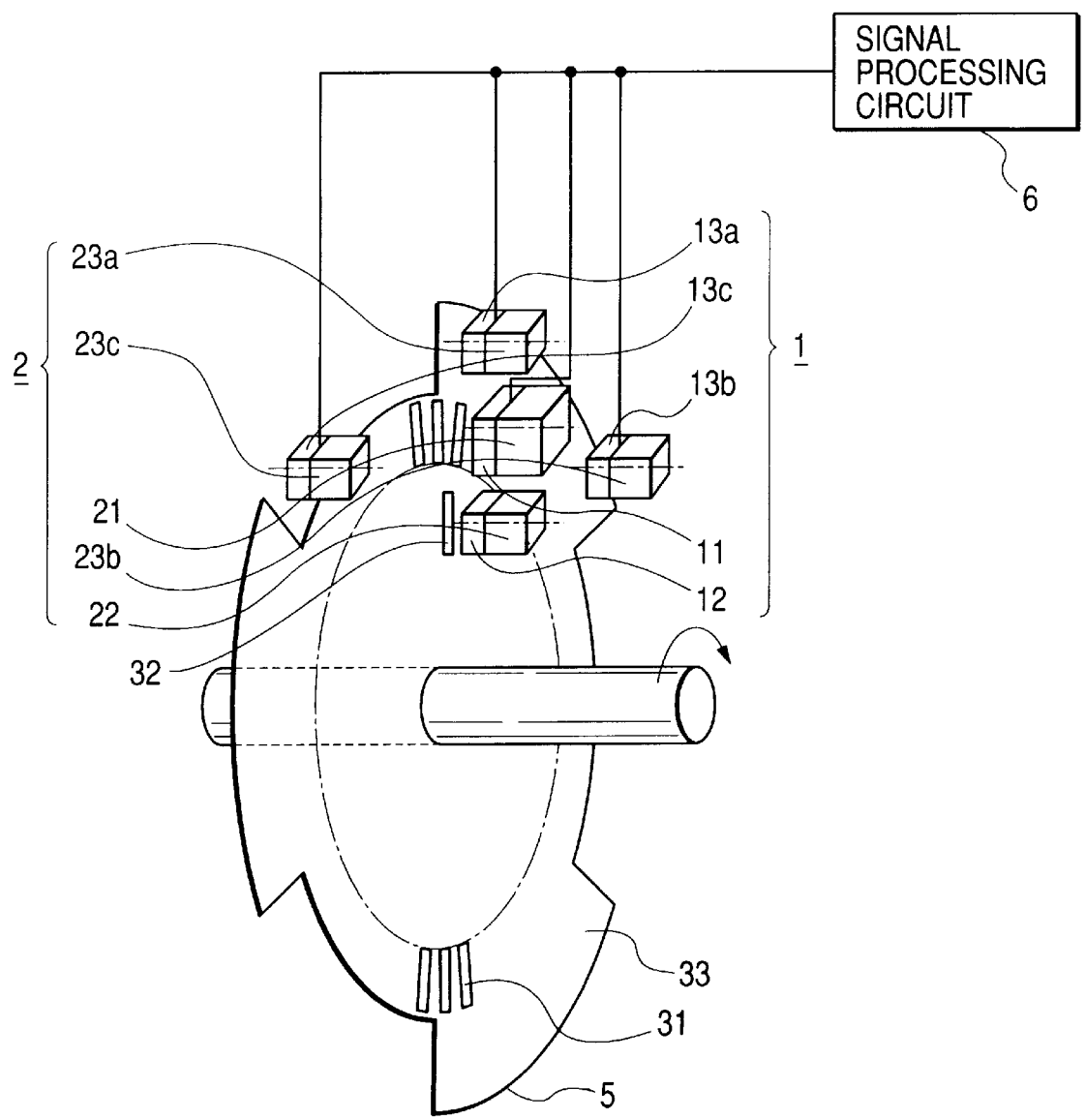
FIG. 1 is a perspective view showing an outlook of a magnetic encoder apparatus of the present invention.

Referring to the drawings, an example of the present invention will be described below.

FIG. 1 is a perspective view showing an outlook of a reluctance type magnetic rotary encoder of the present invention. In FIG. 1, numeral 11 denotes magnetic sensor 11 for position detection. Numerals 13a–13c are magnetic sensors for detecting magnetic pole positions of a motor. Numeral 12 denotes a magnetic sensor for detecting the reference. Numeral 21 denotes a bias magnet to apply the magnetic flux onto the magnetic sensor for reference detection 12. Numerals 23a–23c are bias magnets to apply the magnetic flux onto the magnetic sensors 13a–13c. Numeral 5 denotes a moving disk made of a magnetic substance attached to the moving body. Numeral 6 denotes a signal processing circuit into which a magnetic sensor signal is inputted and from which a square wave is outputted. On the moving disk 5, a slit track 31 for the position detection, a slit track 32 for the reference detection, and a slit track 33 for the magnetic pole detection are formed by a method of etching, or the like. When the moving disk 5 is rotated, the resistance value of the magnetic sensor is changed due to a change of the magnetic flux depending on existence or not of the slit, and this change is converted into an electric signal. Further, this electric signal is wave-shaped in a signal processing circuit 8 and the square wave is obtained. Herein, the arrangement of each slit track may not be the arrangement in FIG. 1, but may be arbitrarily selected.

Figure 2A:
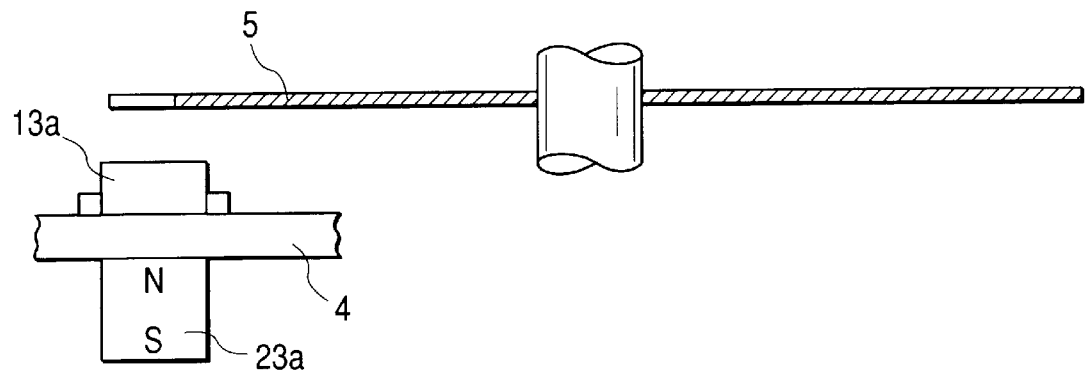
FIG. 2(a) is a side sectional view showing a magnetic sensor.
Figure 2B:
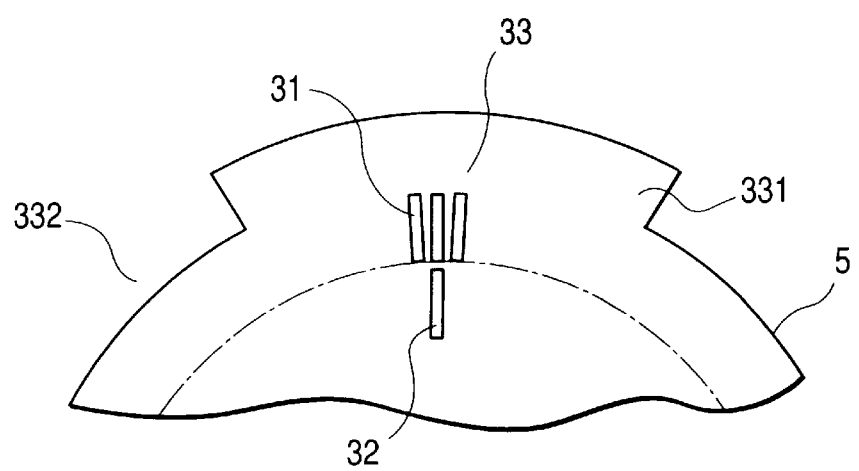
FIG. 2(b) is a partial plan view showing a slit track for the magnetic pole detection.
Figure 3:
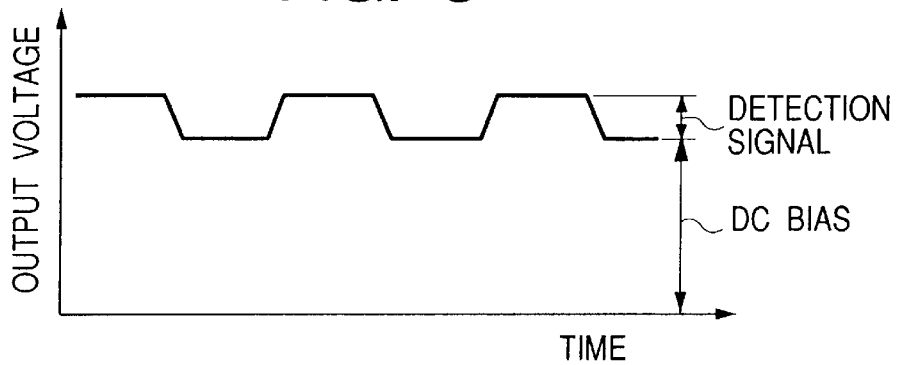
FIG. 3 is a view showing waveform of a pole detection signal of the present invention.

FIG. 2 is a view showing a magnetic pole detection section of the magnetic encoder apparatus of the present invention. FIG. 2(a) is a side sectional view showing a magnetic sensor 13, and FIG. 2(b) is a partial plan view of the slit track 33 for the magnetic pole detection. In FIG. 2, numeral 23a is a bias magnet, and numeral 4 is a non-magnetic substance. The slit track 33 is composed of a protruded portion 331 protruding in the outer diameter direction and a notched portion 332. From the magnetic sensor 13a for the magnetic pole detection, DC bias voltage as shown by an example of a signal output shown in FIG. 3 is outputted by the influence of the magnetic flux of a bias magnet 23a, and the detection signal is detected by being biased by the value of this DC bias voltage. In order to set the DC bias voltage to a certain value, the thickness of the non-magnetic substance 4 is set and arranged. Herein, the non-magnetic substance 4 may also be formed of epoxy resin which is used in circuit boards, or the like.

Figure 4:
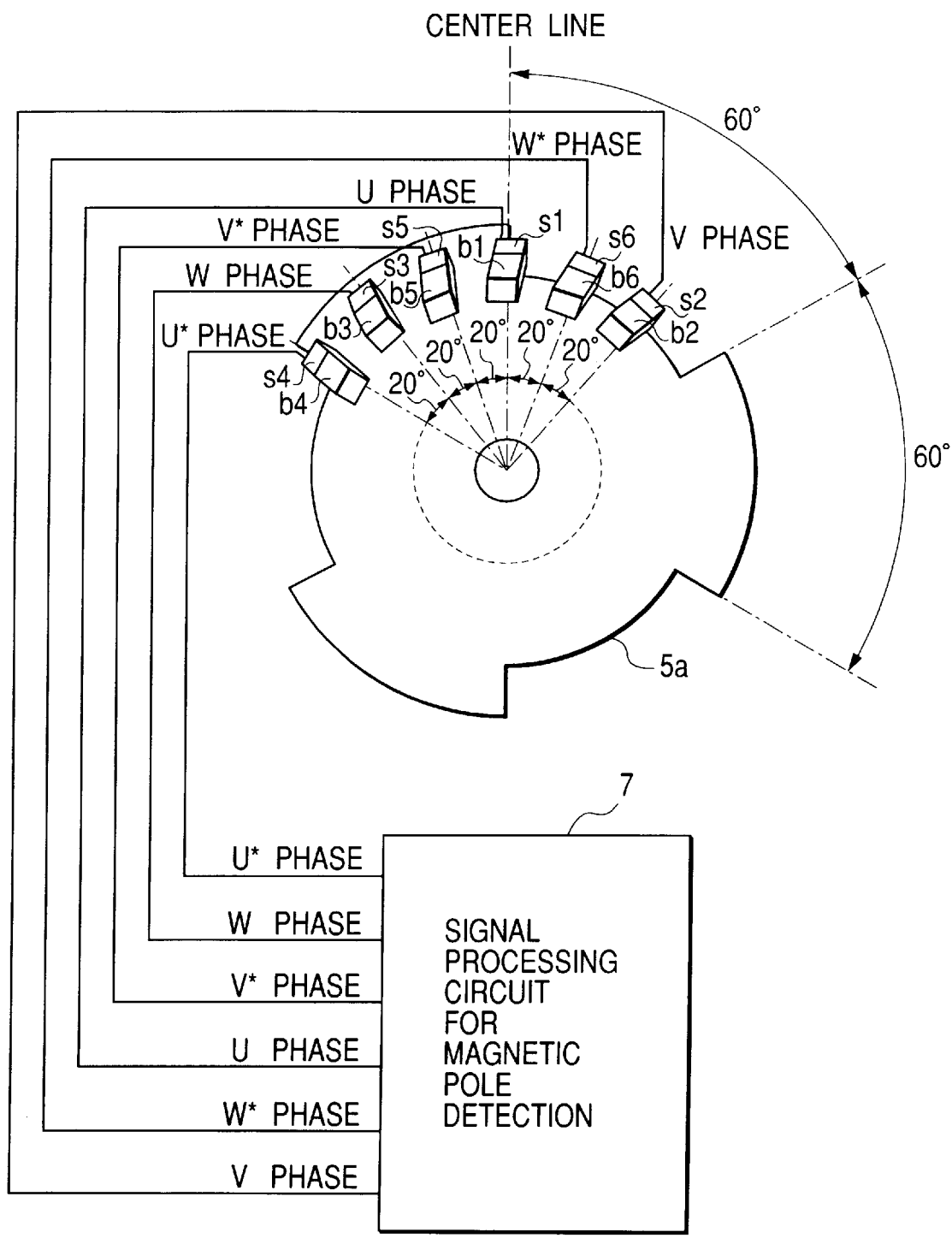
FIG. 4 is a perspective view showing another embodiment of the magnetic encoder apparatus of the present invention.
Figure 6:
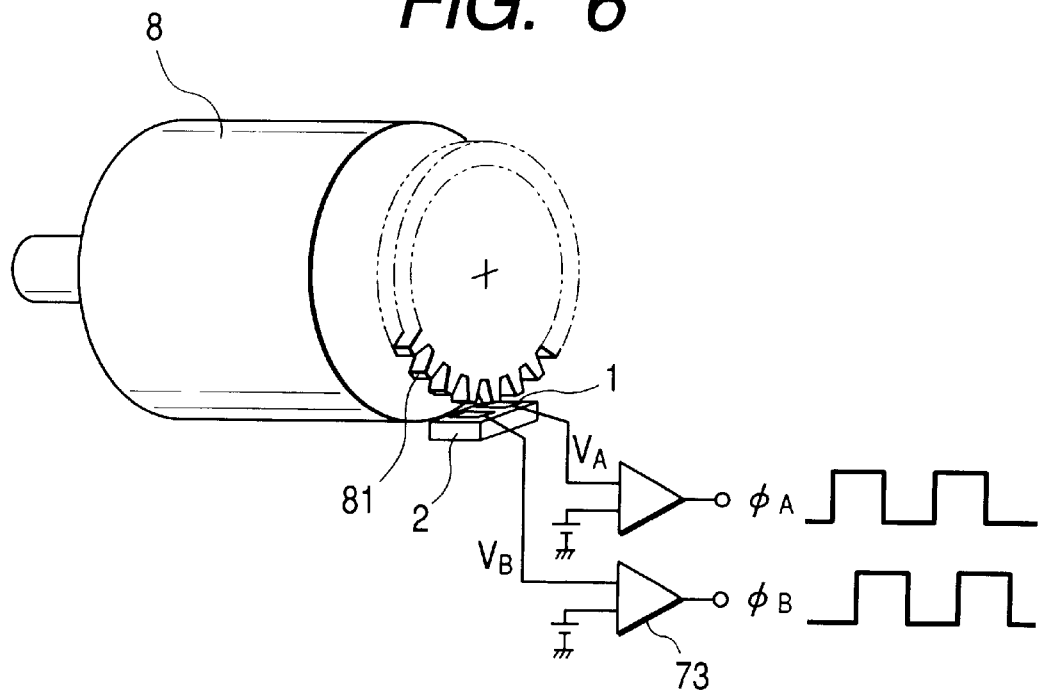
FIG. 6 is a perspective view showing a structure of the conventional example.
Figure 7:
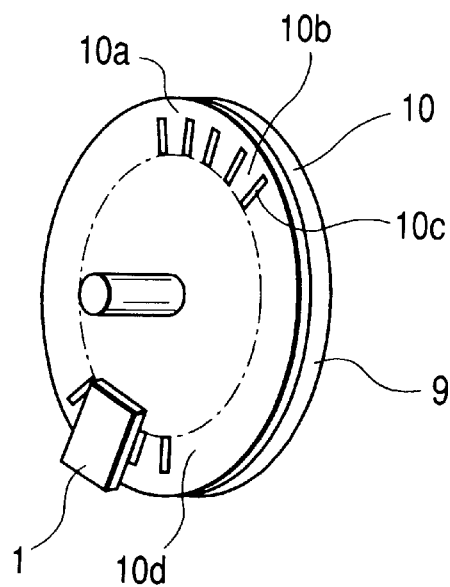
FIG. 7 is a perspective view showing a structure of a main portion of anther conventional example.

FIG. 4 is a perspective view showing the structure of the magnetic sensor 13 for the magnetic pole detection of the present invention. In this embodiment, the slits arranged in the circumferencial direction of the moving disk are divided into 6 units, that is, for each 60°, for a 3 phase 6 pole motor. In FIG. 4, b1–b6 are bias magnets, s1–s6 are magnetic sensors, and respectively for U phase, U* phase, V phase, V* phase, W phase, and W* phase. A U* phase signal is a reversal signal of the U phase signal, a V* phase signal is a reversal signal of the V phase signal, and a W* phase signal is a reversal signal of the W phase signal, and the U phase magnetic sensor is set as the reference, the U* phase magnetic sensor is arranged at a position of −60°, the V phase magnetic sensor is at a position of +60°, the V* phase magnetic sensor is at a position of −20°, the W phase magnetic sensor is at a position of −40°, and the W* phase magnetic sensor is arranged at a position of +20°, so that the phase difference among the U phase signal, V phase signal, and W phase signal is respectively electrically 120°, and thus shifted signal is obtained. The U phase-W* phase signals are differential-amplified in a signal processing circuit 7 for the magnetic pole detection and inputted into the comparator, and the square wave is outputted.

Figure 5:
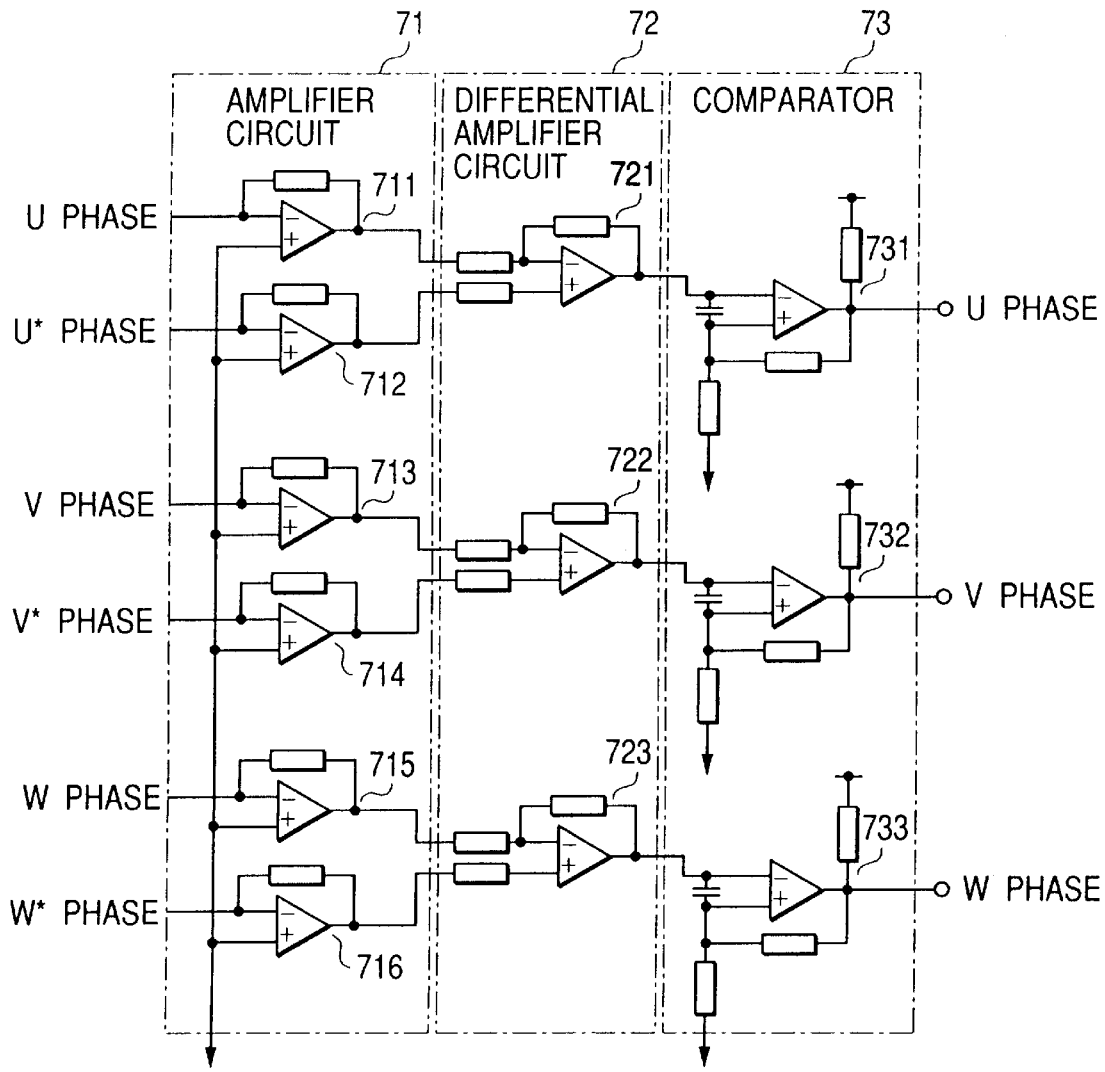
FIG. 5 is a circuit diagram showing a signal processing circuit for the magnetic pole detection of the present invention.

Next, the signal processing circuit 7 for the magnetic pole detection in which the signal is deferential-amplified and from which the square wave is outputted, will be described. FIG. 5 is a circuit diagram of the signal processing circuit 7 for the magnetic pole detection. In FIG. 5, numeral 71 is an amplifier circuit, numeral 72 is a differential amplifier circuit, and numeral 73 is a comparator. The U phase −W* phase signals are amplified in the amplifiers 711–716, the U* phase, V* phase, and W* phase signals are reversed in the differential amplifiers 721–723, and added to the U phase, V phase, and W phase signals, and their output signals are shaped into the square waves in the comparator 73, and the U phase, V phase and W phase signals are respectively outputted.

As described above, when a plurality of slit tracks are formed on one moving disk, a thin type magnetic encoder whose production cost is low, and in which a plurality of signals can be obtained by single moving disk, can be realized. Further, because a magnetic sensor is arranged oppositely to the slit track in the moving slit surface, a size in the diameter direction can be reduced. Further, relating to the magnetic pole detection, the non-magnetic substance is provided between the magnetic sensor and the bias magnet, and because appropriate DC bias voltage can be obtained by adjusting the thickness of the non-magnetic substance, the detection signal whose signal amplitude is large to the DC bias voltage, is obtained, and further, a high performance magnetic encoder which is resistible to the temperature change, and is resistible to noise, can be obtained by the aid of the differential amplification.

Incidentally, a rotary type encoder is described in the present example, however, it is clear that the present invention can also be applied to a linear type encoder.

INDUSTRIAL APPLICABILITY

As described above, the magnetic encoder apparatus of the present invention is lower in the production cost and smaller in the size, and the detection signal having larger signal amplitude to the DC bias value can be obtained therefrom, and further, the apparatus is appropriate for a high performance encoder which is resistible to the temperature change and noise, by the aid of the differential amplification.

What is claimed is:

1. A magnetic encoder apparatus comprising:

a moving disk made of a magnetic substance and having slits arranged in a circumferencial direction thereof for detecting a position thereof;

magnetic sensors being spaced out the moving disk;

bias magnets each provided on the back face of the respective magnetic sensors and situated at where corresponds to the respective slit tracks; and a signal processing circuit for processing a signal from the magnetic sensors, wherein the moving disk includes:

a magnetic pole detection slit track provided with slits for detecting the magnetic pole of a motor and situated an outer periphery portion thereof, the magnetic pole detection slit having a protruded portion protruding to outer diameter thereof and a notched portion;

a position detection slit track provided with the slits for detecting the position thereof and situated inner than the magnetic pole detection slit track; and a reference detection slit track provided with slits for detecting a reference position thereof and situated inner than the position detection slit track, and wherein a non-magnetic substance is provided between each of the magnetic sensor and the bias magnet provided for the magnetic pole detection slit track.

* * * * *